US012737420B2

(12) United States Patent
Fabris et al.

(10) Patent No.: US 12,737,420 B2
(45) **Date of Patent: *Sep. 15, 2026**

(54) REGULAR EXPRESSION MATCHING IN DICTIONARY-ENCODED STRINGS

(71) Applicant: Oracle International Corporation, Redwood Shores, CA (US)

(72) Inventors: Giacomo Fabris, Zurich (CH); Aleksei Kashuba, Zurich (CH); Alexander Ulrich, Freiburg (DE)

(73) Assignee: Oracle International Corporation, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/924,658

(22) Filed: Oct. 23, 2024

(65) Prior Publication Data

US 2025/0045334 A1 Feb. 6, 2025

Related U.S. Application Data

(63) Continuation of application No. 18/070,791, filed on Nov. 29, 2022, now Pat. No. 12,164,574.

(51) Int. Cl.

| | |
|---|---|
| ***G06F 16/00*** | (2019.01) |
| ***G06F 9/448*** | (2018.01) |
| ***G06F 16/903*** | (2019.01) |

(52) U.S. Cl.

CPC ...... *G06F 16/90344* (2019.01); *G06F 9/4498* (2018.02)

(58) Field of Classification Search

CPC ......................... G06F 16/90344; G06F 9/4498

See application file for complete search history.

(56) References Cited

U.S. PATENT DOCUMENTS

| | | | | |
|---|---|---|---|---|
| 10,613,875 B1 | | 4/2020 | Lysaght | |
| 2002/0120598 A1 | * | 8/2002 | Shadmon | G06F 16/81 |

(Continued)

OTHER PUBLICATIONS

Ganty, P et al., Regular Expression Search on Compressed Text. 2019 Data Compression Conference (DCC). [online][retrieved Apr. 14, 2026]. Retrieved from the Internet <URL: https://oa.upm.es/57609/1/INVE_MEM_2019_307995.pdf> (Year: 2019).*

*Primary Examiner* — Syed H Hasan

(74) *Attorney, Agent, or Firm* — Hickman Becker Bingham Ledesma LLP

(57) ABSTRACT

Techniques are described for generating an encoded-string automaton for a regex pattern from a decoded-string automaton of the regex pattern. In an embodiment, the process obtains a decoded-string automaton of the regex pattern and applies unique decoded string value(s) from the dictionary of the encoding. When applied at a selected state in the decoded-string automaton, the application may yield a transition to at least one target state in the decoded-string automaton for a unique dictionary value. Such a transition generates a transition in the encoded-string automaton from an encoded state corresponding to the selected state in the decoded-string automaton to a target state in the encoded-string automaton corresponding to the target state in the decoded-string automaton. The generated transition in the encoded-string automaton is conditioned on the token of the unique decoded string value in the dictionary.

18 Claims, 11 Drawing Sheets

(56) References Cited

U.S. PATENT DOCUMENTS

2008/0046423 A1* 2/2008 Khan Alicherry ........................... G06F 16/90344
2008/0270342 A1 10/2008 Ruehle
2009/0193045 A1 7/2009 Werner
2010/0023318 A1 1/2010 Lemoine
2010/0198850 A1* 8/2010 Cytron ............. G06F 16/90344 707/758
2014/0067736 A1 3/2014 Noyes
2014/0244554 A1* 8/2014 Atasu ................... G06F 9/4498 706/12
2020/0082037 A1 3/2020 Zhang

* cited by examiner

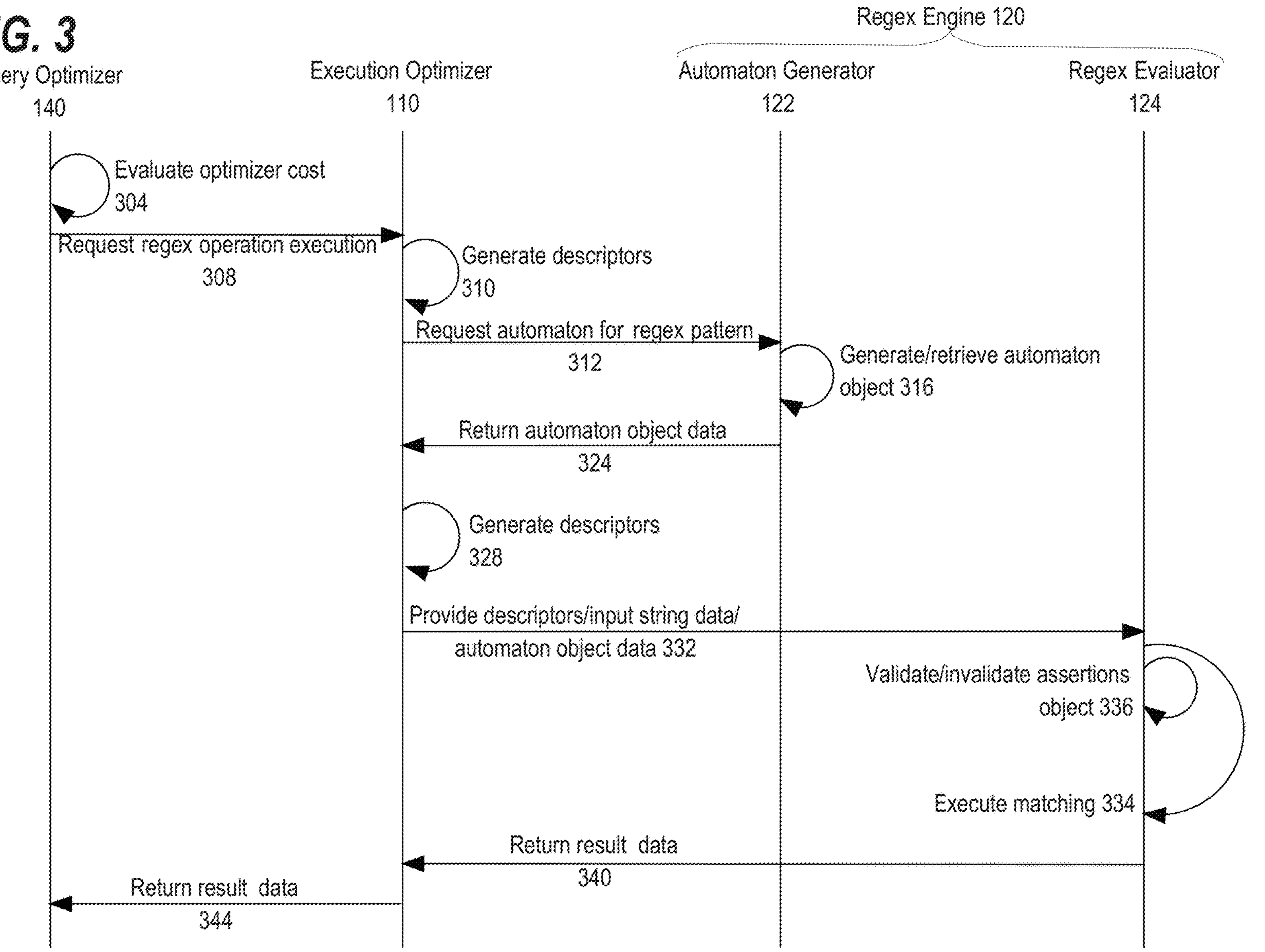
FIG. 3
Query Optimizer 140
Execution Optimizer 110
Regex Engine 120
Automaton Generator 122
Regex Evaluator 124
Evaluate optimizer cost 304
Request regex operation execution 308
Generate descriptors 310
Request automaton for regex pattern 312
Generate/retrieve automaton object 316
Return automaton object data 324
Generate descriptors 328
Provide descriptors/input string data/ automaton object data 332
Validate/invalidate assertions object 336
Execute matching 334
Return result data 340
Return result data 344

Receive regex pattern
405
Query automaton object store
410
Exists?
415
No encoded-string automaton
Yes
No decoded-string automaton
Convert decoded string automaton into encoded-string automaton
440
Parse regex pattern
420
Generate automaton execution logic
425
Store automaton object in object store
430
Return automaton object data
435

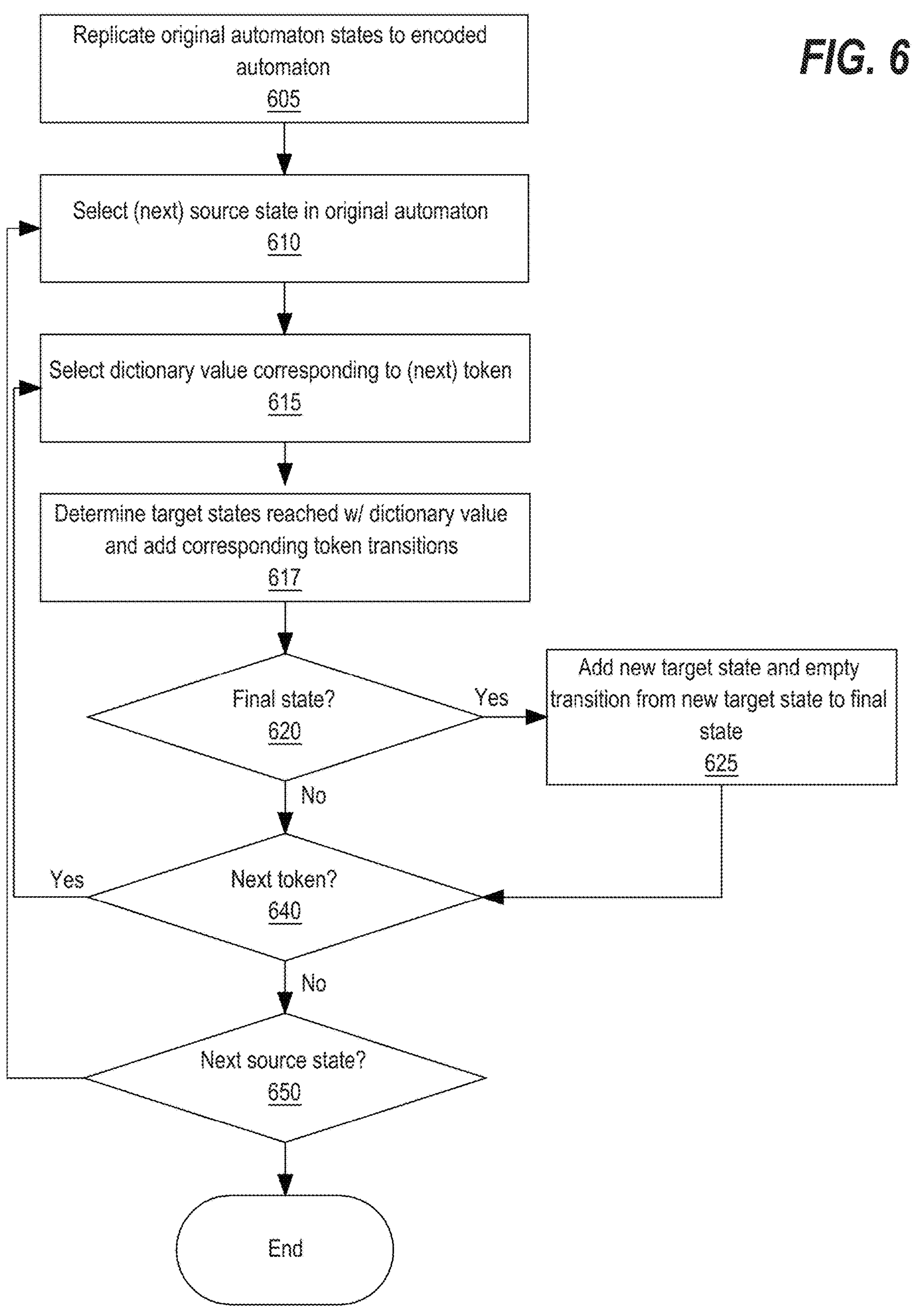
FIG. 6
Replicate original automaton states to encoded automaton
605
Select (next) source state in original automaton
610
Select dictionary value corresponding to (next) token
615
Determine target states reached w/ dictionary value and add corresponding token transitions
617
Final state?
620
Yes
Add new target state and empty transition from new target state to final state
625
No
Next token?
640
Yes
No
Next source state?
650
End Receive descriptor corresponding to assertion
905
Execute based on asserted execution logic
910
Assertion validated by descriptor?
915
No
Yes
(Load and) execute alternative execution logic
925
Continue executing with same execution logic
920
Increment invalidation count
930
Above threshold?
935
No
Yes
End
Disable optimization
940

SERVER 1130
INTERNET
ISP
1128
1126
LOCAL NETWORK 1122
HOST 1124
NETWORK LINK
1120
1100
STORAGE DEVICE 1110
ROM 1108
MAIN MEMORY 1106
BUS 1102
COMMUNICATION INTERFACE 1118
PROCESSOR 1104
DISPLAY 1112
INPUT DEVICE 1114
CURSOR CONTROL 1116

REGULAR EXPRESSION MATCHING IN DICTIONARY-ENCODED STRINGS

BENEFIT CLAIM

This application claims the benefit as a continuation of application Ser. No. 18/070,791, filed Nov. 29, 2022, by Fabris et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE TECHNOLOGY

The present invention relates to the field of electronic database management, in particular to regular expression matching in dictionary-encoded strings.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Pattern matching is a ubiquitous computational task performed in many computer applications that are performing data processing. The pattern to be matched may be expressed in a regular expression (regex) which specifies a set of accepted strings in a particular syntax. A regex engine (which may be implemented in software and/or hardware) computes a regular expression over an input string (including a wider class of patterns, such as regexes with backreferences). The computation generates output(s) indicating whether the regex matches the input string and, in some cases, the matched portion of the string itself.

Database management systems (DBMS) may utilize regexes in a variety of data-matching tasks in DBMS's internal operations or as part of the execution of external requests from client applications. As part of such tasks, the DBMS manipulates or filters data according to the result of the regex computation. For example, a received SQL query from a client application may include the REGEXP_LIKE expression in the WHERE clause. The expression specifies the matching regex for filtering the result set of the query. When the query is executed, the regex is computed and applied to the returned data to filter out the result set for the query. As another example, the DBMS may perform regex computation for internal tasks such as log redaction and application firewalling.

Despite the wide usage, performing regex matching is a compute-heavy task, and the computing resources spent may drastically grow with larger input strings and/or more complex regexes. The larger the input strings are, the more memory space is occupied by the strings, and the more processing cycles are spent computing the regex on the string.

One approach to reducing the memory space for strings is to encode/compress the strings based on an encoding algorithm into encoded/compressed strings. The encoded strings occupy a fraction of the memory space than that of the original strings. However, to perform a regex operation on an encoded string, the encoded string has to be decoded first because the regex defines the pattern for a decoded string rather than an encoded string. Thus, the decoding operation is performed first to yield the decoded string, and thereafter, the regex matching operations are performed on the decoded string. The decoding operation uses additional compute resources, and depending on the frequency of the regex operations, the spent compute resources may negate the benefit of storing the string in the encoded format that saves memory space.

Furthermore, since the regex operation may include multiple string-matching operations on the string data (or portions thereof), the data is loaded into the fast access memory, the most expensive type (e.g., operational memory). Accordingly, the regex operation taxes the most expensive of the resources in the form of fast access memory. Additionally, each string matching operation involves I/O and/or comparison operation, thereby using a significant amount of CPU cycles.

One approach to alleviate this problem is to have a dedicated hardware solution for regex operations. The regex engine, performing regex operations, may be implemented as part of a separate ASIC, FPGA, or sub-unit on SOC. Such solutions indeed accelerate the execution of regex operations but are expensive and lack flexibility. Additionally, because of the sequential nature of execution, any hardware acceleration will eventually be limited by forced waits when interdependent data is evaluated.

BRIEF DESCRIPTION OF THE DRAWINGS

In the drawings of certain embodiments in which like reference numerals refer to corresponding parts throughout the figures:

FIG. 3 is a sequence diagram that depicts the process of executing optimized regex matching, in an embodiment;

FIG. 6 is a block diagram that depicts a process for generating an encoded-string automaton from a decoded-string automaton, in an embodiment;

DETAILED DESCRIPTION

Figure 1:
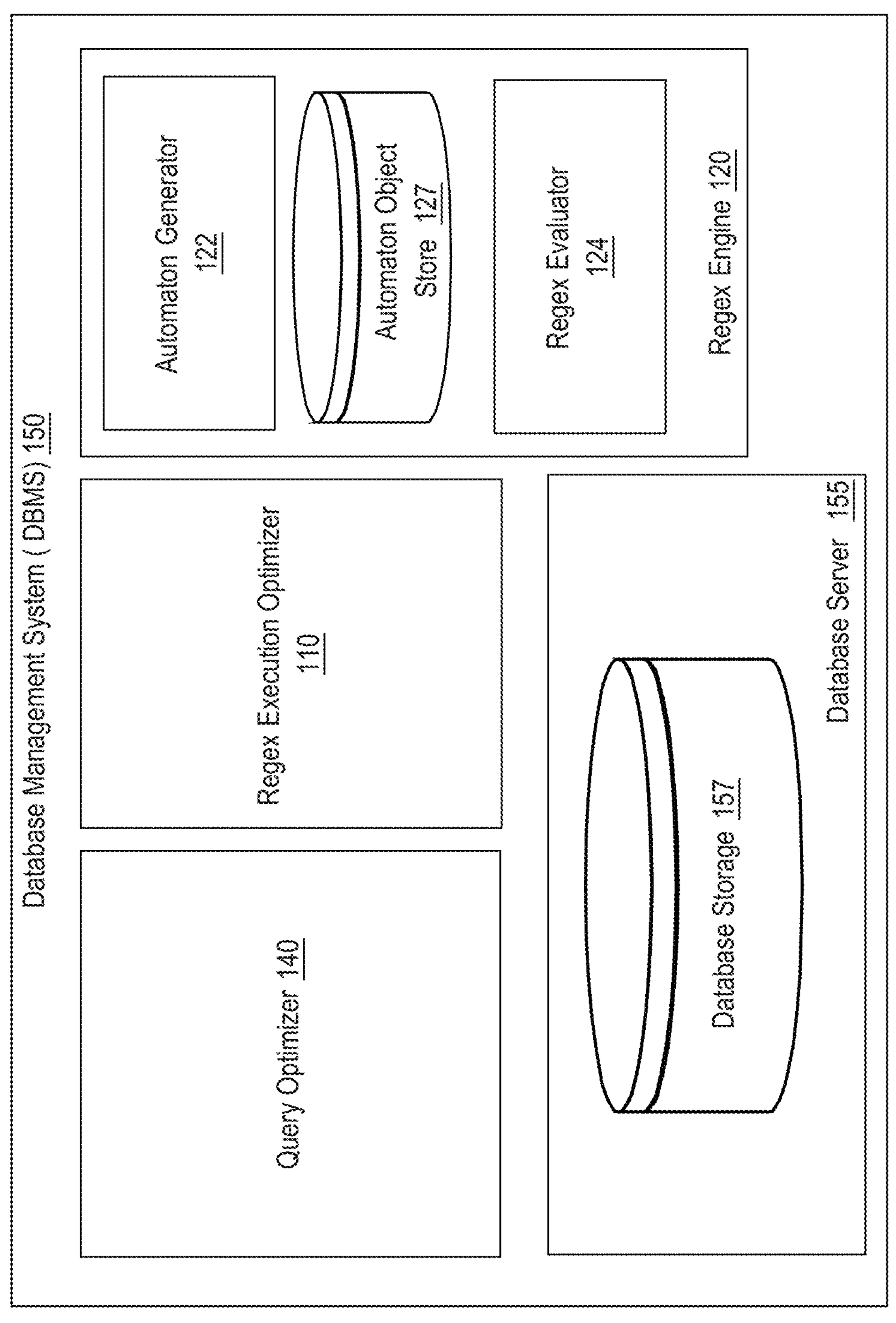
FIG. 1 is a block diagram that depicts a DBMS with a regex engine for evaluating regex operations, in an embodiment.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

Techniques are described to improve the performance of regular expression (regex) evaluation in a database management system (DBMS) by generating at run-time a compiled code (e.g., machine bytecode) that is specialized to the regex pattern and/or the input string on which the regex pattern is evaluated. The techniques further include the DBMS determining the execution logic from multiple alternative execution logics of the generated machine code to use for executing the regex pattern on the input string. The selection depends, at least in part, on the descriptors provided to the regex engine evaluating the regex pattern. The term "descriptor" refers to herein to input data that is used for determining the selection of an optimized execution logic for matching a regex pattern in string(s). Descriptors may describe various properties of the string input data and/or regex pattern relevant for optimizing the matching operation (including accessing and processing string input data for matching). Because the DBMS may use much more efficient compiled machine code for the execution logic optimized for the input and/or the regex pattern during the run-time, the techniques provide a substantial reduction in query execution time for a query that includes regex pattern matching.

However, using specialized execution logic for executing a particular regex on a particular string has an overhead, a "warm-up" cost. In an embodiment, the DBMS evaluates whether the benefit of using optimized execution logic that is particular to the regex pattern and/or the input string outweighs the warm-up cost. In such an embodiment, based on the cost, the DBMS may use different levels of optimization for the regex pattern evaluation on the input string by the regex engine. The factors for evaluating the optimization level to use may include the available computing resources to the DBMS, the size of the string input data, and the complexity of the regex pattern.

Further techniques are described to generate an automaton to match a regular expression (regex) pattern in an encoded string without decoding the string. Using the techniques, the regex that is specified for an unencoded string may be matched in an encoded string without decoding.

To match a regex in a decoded string, a regex engine performing the matching operation generates an automaton and provides the string as the input to the automaton. The term "automaton" refers herein to a finite state machine for matching a regex pattern in string input data. In the automaton, a transition between states is performed based on, at most, one character or token of the input string, and the transition to the final state represents a match of the regex pattern in the string input data. The term "automaton object" refers herein to the programmatic representation of the automaton, which may be loaded into the regex engine for evaluation of the regex pattern. An example of an automaton object is a compiled execution logic for an automaton that may be readily executed by the regex engine. Another example of an automaton object may be a data structure that represents the finite state machine of the automaton, which is used to execute the state machine for string input data by the regex engine.

The string input data may include or reference a decoded or an encoded string. In an embodiment, to use an encoded string without decoding, the automaton of a regex pattern generated for a decoded string (decoded-string automaton) is converted to an encoded-string automaton. A dictionary encoding may be used for encoding strings, mapping strings, or substrings (n-grams) to tokens in dictionary (ies).

The decoded-string automaton is obtained, in an embodiment, and traversed from the start state to the final state. The traversal is based on the input string corresponding to the values from the encoding dictionary. Based on the reachable states, new transitions and/or state(s) are generated for the corresponding tokens. For example, in a decoded-string automaton, a transition may exist from a source state to a target state conditioned on input character(s). Based on the input characters being mapped to a token, in an encoded-string automaton, a new transition is generated from the corresponding source state to the corresponding target state conditioned on the token. Using this approach, the transition (s) from a source state to other states of the original decoded-string automaton are replaced by a set of new transitions that correspond to the tokens in the dictionary. In some embodiments, new state(s) may be generated in the encoded-string automaton that do not exist in the original automaton.

The generated automatons (decoded-string or encoded string) may be stored in an automaton object store to avoid re-generating an automaton and/or the object thereof for the same regex pattern. Once an automaton object is generated for a regex pattern, the automaton object is stored in the automaton object store in association with the regex pattern. The next time the DBMS receives the same regex for matching an input string, even if the input string is different, the DBMS may skip the generation of another automaton for the same regex pattern and instead may retrieve the automaton object from the automaton object store based on the regex pattern.

The regex for an automaton may be received by the DBMS as part of a query that further specifies the data object on which to apply the regex pattern for matching. As part of the execution of the query operation for matching the regex pattern, the DBMS requests the regex engine to execute the corresponding automaton object on the string data of the database object.

In an embodiment, the regex engine may contain multiple alternative execution logics to perform the same task for regex pattern evaluation. The task may be related to the accessing or processing of the string input data or the evaluation of the regex pattern on the string(s). For example, the regex engine may maintain different alternative execution logics for reading input strings, each corresponding to a different database data type of the string. The varchar type column strings are directly read from memory, while the large object (LOB) type strings are streamed. The two alternative execution logics are optimized for reading the corresponding data type. The regex engine may load and/or execute the corresponding optimized execution logic on the assertion indicating which input string type is expected. If the assertion is invalidated on the subsequent executions, the regex engine may load and execute the alternative optimized executive logic or fall back on a non-optimized execution logic. Accordingly, the DBMS performs speculative execution based on the assertion, which, if validated, saves the DBMS computing resources and reduces the latency between the issuing of the command and generating the result of the regex execution.

System Overview

FIG. 1 is a block diagram that depicts a DBMS with a regex engine for evaluating regex operations, in an embodiment. DBMS 150, among other components, includes database server 155, query optimizer 140, regex execution optimizer 110, and regex engine 120. DBMS 150 is described in more detail hereafter, specifically in the "Database Management Systems" section.

Although the regex components are described as part of DBMS 150, in other embodiments, the regex components may be outside of DBMS 150 but invocable from DBMS 150.

In DBMS 150, database server 155 stores and serves up database objects for the DBMS into and from database storage 157. When database server 155 receives a query from a client application (not depicted in FIG. 1), DBMS 150 may pass the query to query optimizer 140 for execution.

Query optimizer 140 receives a query as input and generates an execution plan for the query, in an embodiment. As used herein, an "execution plan" is an ordered set of operators used to access data and perform operation(s) on the data in a database management system. Each operator may contain one or more data operations on the output data of another operator or on database objects.

Query optimizer 140 may support various regex operator (s). The term "regex operator" refers herein to an operator that operates on input string(s) using the regex pattern specified in the operator. The regex operator may also take as input metadata about the string input data (also referred to as regex option(s)). Non-limiting examples of regex operators are listed below.

REGEXP_LIKE (source, pattern, param): selects rows of the source matching the pattern; the matching behavior may be controlled using flags passed to the param argument.

REGEXP_COUNT (source, pattern, pos, param): returns the number of separate matches for the pattern in the string(s) of source, starting at the character with the index position in the source string.

REGEXP_REPLACE (source, pattern, replace, pos, n, param): replaces the n-th occurrence of a substring in string(s) of source matching the pattern with the string replace; the search starts at the character with the index position.

REGEXP_INSTR (source, pattern, pos, n, ret, param, subexpr): searches for the position of the n-th occurrence of a substring in string(s) of source matching the pattern starting at the character with index position. If the pattern contains capturing groups, the function may return the position of a capturing group of the regex by passing its corresponding index as subexpr.

REGEXP_SUBSTR (source, pattern, pos, n, param, subexpr): same as REGEXP_INSTR but returns the matched substring instead.

Other regex operators may also be supported by DBMS 150; for example, $regex_entry in the documental model may be called an operator of a filter specification for document data.

Figure 2:
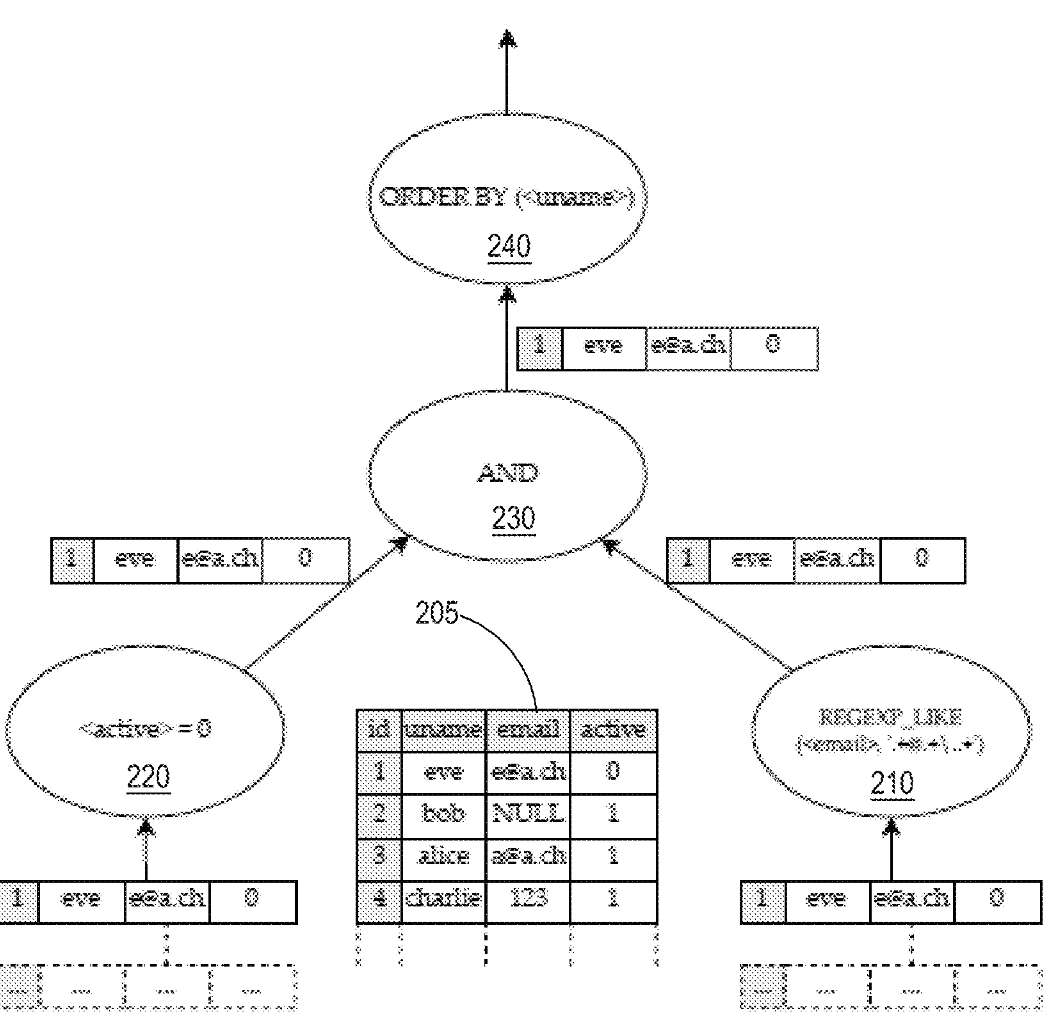
FIG. 2 is a block diagram that depicts an example execution plan that includes a regex operator, in an embodiment.

FIG. 2 is a block diagram that depicts an example execution plan that includes a regex operator, in an embodiment. In this example, DBMS 150 receives a query with the "SELECT * FROM table WHERE active–0 AND REGEXP LIKE (email, '.+@.+\.+') ORDER BY uname" statement from a client application. Query optimizer 140 generates execution plan 200 that includes operators 210-240 operating on table 205 stored in database storage 157 for this example. When DBMS 150 executes regex operator 210, query optimizer 140 invokes regex execution optimizer 110 for initiating the execution of the regex pattern in the query on table 205, in an embodiment.

Execution optimizer 110 generates descriptors for optimizing the executing of a regex pattern on input strings by regex engine 120. Execution optimizer 110 receives string input data which may be a pointer to the data source of the regex operator. Additionally, execution optimizer 110 receives the regex pattern to be matched in the string input data. Metadata may also be received that additionally describes the string input data and/or the regex pattern. Using the received data, execution optimizer 110 generates descriptor values that cause regex engine 120 to make assertions to optimize the execution of the regex pattern matching on the string input data. The descriptors are described in more detail further below.

Regex evaluator 124 of regex engine 120 may execute the matching of the regex pattern on the string input data based on the assertions validated by the received descriptors. In an embodiment, regex evaluator 124 performs the matching operation using the automaton object corresponding to the received regex pattern. Automaton objects are generated by automaton generator 122 based on the regex patterns received, in an embodiment. The generated automaton objects may be stored in automaton object store 127 in association with the corresponding regex patterns.

Additionally or alternatively, automaton object store 127 may store regex pattern-specific descriptors based on which regex evaluator 124 may validate assertions to optimize the execution of the regex pattern.

In an embodiment, automaton object store 127 is organized as a multi-level cache. In such an embodiment, a higher-layer cache and a lower-layer cache are maintained. The higher layer cache maintains in-use or more frequently used automaton objects, and the lower layer cache maintains less frequently used automaton objects. For example, the first, highest layer of cache, may maintain active automaton objects, which are those that have been requested by execution optimizer 110 and have not yet been released from executing by regex evaluator 124. A counter is maintained with each generated automaton object to indicate the number of usages for an automaton object. Based on the counter, the second layer cache may continue to maintain the automaton object once it is no longer in use or may evict it based on the least-recently-used (LRU) approach. Other types of hierarchical or non-hierarchical cache structures may be used for automaton object store 127.

An automaton object stored in automaton object store 127 may be provided to execution optimizer 110 when execution optimizer 110 requests the automaton object for the received regex pattern. Thereby, computing resources are saved on re-generating the automaton object for the regex pattern.

In an embodiment, having the automaton object for a regex pattern, regex evaluator 124 performs the regex operation by feeding the input strings of the string input data into the automaton object. The result of the operation (e.g., match or no match) is returned for each string of the string input data to execution optimizer 110. The result data from the regex operation is then returned to query optimizer 140. Query optimizer 140 continues the performance of the operations in the execution plan based on the returned result data until the final result set is produced.

For example, continuing with FIG. 2, after the execution of regex operator 210 by regex engine 120 as invoked by execution optimizer 110, subsequent operators 230 and 240 are executed by query optimizer 140. Operator 230 selects the intersection of the results from filtering operation 220 and regex operation 210. The ordering operator 240 orders the resulting data set of the intersection and returns the ordered data set as the final result set for the query. Database server 155 returns the final result set to the client application.

For purposes of exposition, various software components on a computer system, such as a DBMS, are described herein as performing actions, such as receiving an input, being executed, and/or generating an output when in a fact a computer system process executing the software component performs the actions. For example, a regex engine performing matching operations, generating an automaton, or executing an automaton may refer to a computer system process execution software of the regex engine causing the computer system process to perform matching operations, generating an automation, or executing an automaton. As another example, an execution optimizer generating descriptors may refer to a computer system process executing software of the execution optimizer to cause the computer system process to generate descriptors.

Regex Run-Time Engine Overhead

FIG. 3 is a sequence diagram that depicts the process of executing optimized regex matching, in an embodiment. At step 304, query optimizer 140 may evaluate the cost of using optimized regex pattern matching. To determine the cost, query optimizer 140 may evaluate the factors of the available computing resources, the amount of the string input data, and/or the complexity of the regex pattern. Query optimizer 140 may evaluate these factors based on comparing the factors to pre-defined thresholds. For example, generating machine code execution logic(s) of regex engine 120 and/or executing regex engine 120 (which may run as a separate process in DBMS 150) may require a minimum amount of CPU cycles, a minimum size of system memory and/or minimum bandwidth. If DBMS 150 fails to have the requisite one or more minimums, the execution by regex engine 120 may be performed internally or only partially offloaded to regex engine 120.

Additionally or alternatively, the greater is the number of rows of the data source on which the regex pattern is to be matched, the greater the benefit of generating and executing the optimized execution logic. Therefore, the number of rows for the regex operator may be compared to the pre-defined minimum number of rows representing the number of rows in excess, of which the benefit of optimized execution outweighs the normal execution. Other size-based properties of the string input data may be used.

Additionally or alternatively, the complexity of the regex pattern may be used to determine the existence of benefit for the optimized execution. The complexity may be evaluated by the number of characters, the number of operations, the number of quantifications, and/or the number of groupings in the regex pattern In an embodiment, query optimizer 140 may maintain at least two types of regex operators: optimized and non-optimized operators. Additionally, multiple levels of optimized operators may be maintained depending on the number of optimizations requested from regex engine 120. The cost of each optimized operator may vary based on the enabled optimization. For example, one optimization may only be used in optimized execution logic for the automaton but not for processing string input data and vice versa. The cost of executing the optimized regex operator, evaluated by the above-mentioned factors, determines which optimization level is selected for the regex operation execution and whether the non-optimized execution is selected for the execution plan.

Interfacing with Regex Execution Engine

Continuing with FIG. 3, at step 308, execution optimizer 110 receives a request for matching the specified regex pattern in the specified string input data. Although FIG. 3 depicts the request being received from query optimizer 140 as part of query execution; other DBMS 150 components (e.g., log parsers) may also request execution optimizer 110 to execute an optimized regex matching.

In an embodiment, execution optimizer 110 provides an optimization interface for regex executions on string input data by regex engine 120. Based on the data received from query optimizer 140 and other sources, execution optimizer 110 provides input data to regex engine 120 that enables regex engine 120 to perform speculative execution of regex pattern matching.

For example, execution optimizer 110 may generate input to the regex engine on the character set, storage format, or data type of the input strings of the string input data based on the metadata received in the request from query optimizer 140.

At step 310, execution optimizer 110 may use the request's metadata about the specified regex pattern to generate descriptors for automaton generator 122 to optimize the automaton generation for the regex pattern. The descriptors may include instructions on the type of automaton to generate and/or whether to compile the automaton into machine code execution logic or generate a data structure for the automaton. Automaton generator 122 may validate the assertions of the descriptors and follow the instructions or may invalidate the assertions of the descriptors executing in a different manner than instructed.

At step 312, execution optimizer 110 may request automaton generator 122 for the automaton object for the specified regex pattern for performing the matching on the string input data.

Automaton Generation and Storage

At step 316, automaton generator 122 receives a regex pattern for which to return an automaton object. The request may include metadata instructing automaton generator 122 that the automaton object may be optimized.

Figure 4:
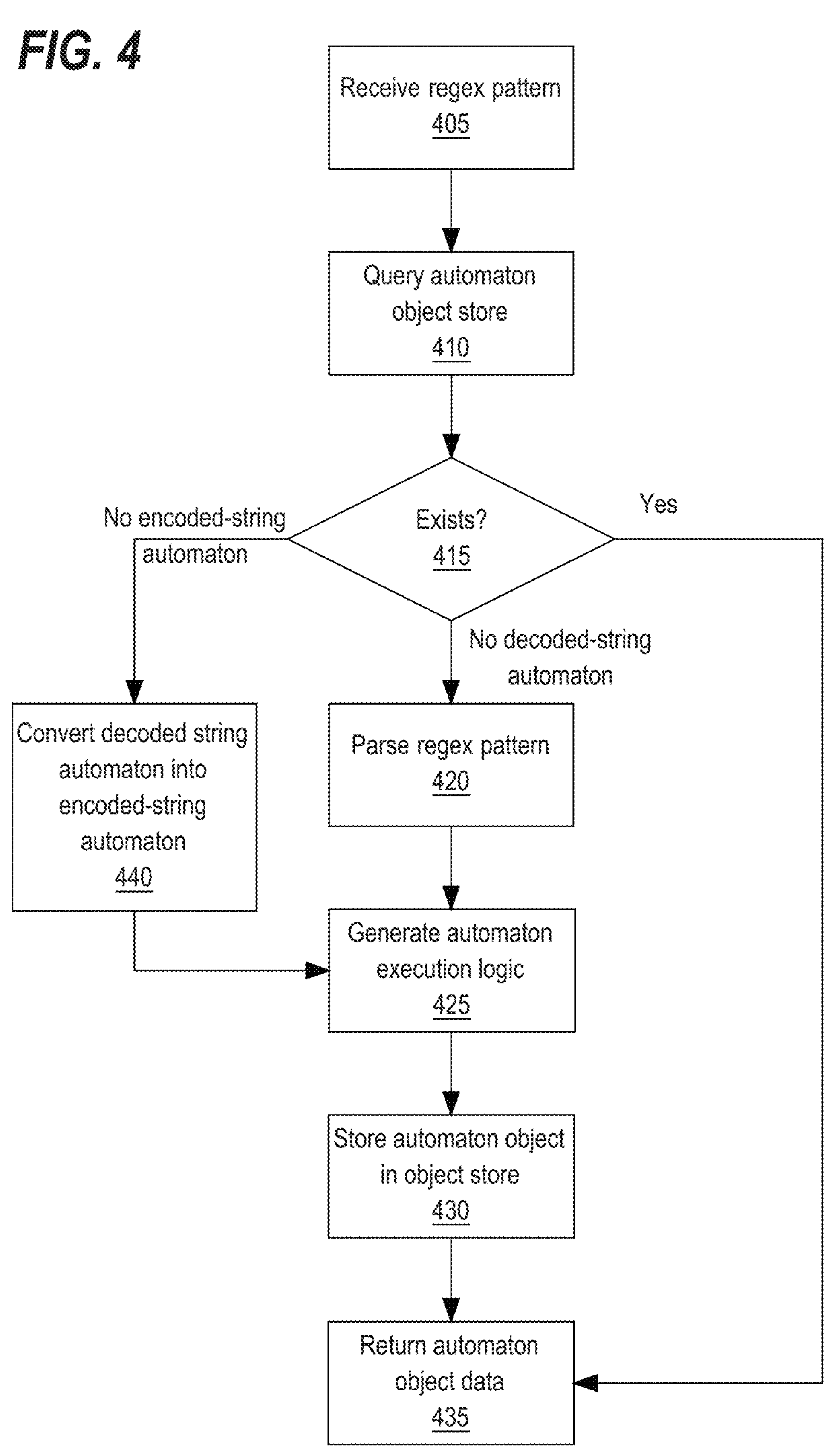
FIG. 4 is a block diagram that depicts a retrieval of automaton for a regex pattern in an embodiment.

FIG. 4 is a block diagram that depicts a retrieval of an automaton for a regex pattern in an embodiment. At step 405, automaton generator 122 receives a request to obtain an automaton object corresponding to the indicated regex pattern.

As discussed above, storing the generated automaton object for the previously requested regex pattern saves considerable computing resources. With the storing, there is no need to have any warm-up overhead for previously executed regex patterns. Indeed, many workloads are likely to reuse the same regex pattern over multiple queries (e.g., data validation); caching would allow reuse of the generated data structure or the machine code output and therefore avoid unnecessary interpretation, profiling, and optimization efforts.

Accordingly, in such an embodiment, at step 410, automaton generator 122 queries automaton object store 127 to determine whether an automaton object already exists for the regex pattern indicated in the request. If, at step 415, the automaton object exists, then the process transitions to step 435 to return the automaton object data to the requestor.

Otherwise, the process transitions to step 420 to generate an automaton object for the regex pattern.

At step 420, the specified regex pattern is parsed. The parsing identifies the elements of the regex pattern, such as the character(s) to be matched, the quantification(s) and/or grouping(s) for the characters, and the Boolean operations.

In an embodiment, a non-deterministic finite automaton (NFA) is generated by converting each element into states and transitions of states. NFA is a non-deterministic state machine that may include multiple reachable states (states that may be transitioned from a particular state) for the same input condition. NFA may also include empty transition (transition that may be transitioned without any condition. Accordingly, such transitions do not require any input character. In parsing, when denoting the start or end state for the grouping, an empty transition may lead to a grouping state. Additionally, if the elements are in the "OR" operation, disjunction, the split from one state to two different alternate states may be denoted by empty transitions. Thus, the transition between states may occur based on evaluating at most one character (or none at all). Thereby, each input character of a string causes at minimum one state transition, even if such a transition is a loop back to the initial state from which the transition is initiated.

Figure 5A:
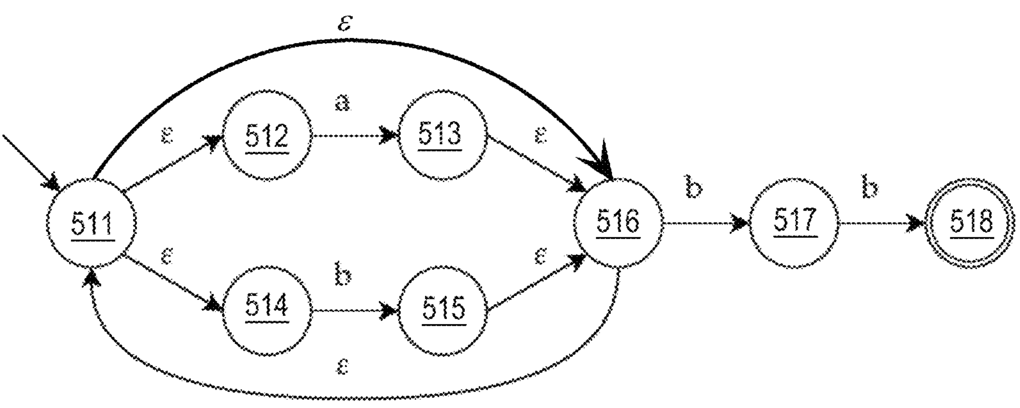
FIG. 5A is a block diagram that describes a non-deterministic automaton (NFA) generated from parsing an example regex pattern, in an embodiment.

FIG. 5A is a block diagram that describes a non-deterministic automaton generated from parsing an example regex pattern, in an embodiment. Automaton generator 122 receives a regex with the pattern of "(a|b)*bb". The regex pattern may be interpreted as the character "a" or the character "b" followed zero to infinite times followed by two characters of "b".

Automaton generator 122 may parse each element of the example regex by assigning element(s) to state(s) and/or transition(s) of the states in the corresponding NFA. For example, the start of the grouping (e.g., "(") corresponds to start state 511, and the disjunction operator (e.g., "|") corresponds to empty transitions, ε, to states 512 and 514, each of which corresponds to alternative matching within the disjunction. If the characters "a" or "b" are matched within each branch of the disjunction, the process transitions to "a" and "b" transitions from corresponding disjunction states 512 and 514 to respective states 513 and 515. The grouping is concluded with an empty state transition to state 516 from both branches of the disjunction. Based on parsing the quantification operator "*" for the grouping indicating zero or more instances, automaton generator 122 determines that the whole grouping may be skipped by adding an empty transition from start grouping state 511 to grouping end state 516 and vice versa for matching the grouping infinite times.

Finally, for this example of regex parsing, the two characters "b" indicate a match. The first character "b" match is represented by the transition of "b" from state 516 to 517, and the second consecutive character "b" match is represented by the transition from the first "b" matched state 517 to the final "b" match state 518. Accordingly, the transition to final state 518 denotes a match of the regex pattern "(a|b)*bb".

Other parsing methodologies may be used to generate NFA from a regex pattern. For example, the regex pattern may be parsed to generate a deterministic finite automaton (DFA) using a different methodology. The exact methodology used is not critical for the approaches described herein.

Figure 5B:
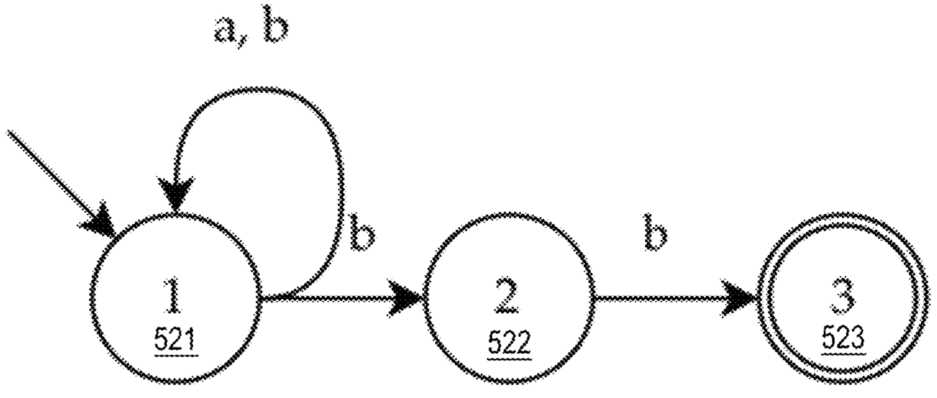
FIG. 5B is a block diagram depicting the NFA after collapsing empty transition state(s) in an original NFA, in an embodiment.

FIG. 5B is a block diagram depicting the NFA after collapsing empty transition state(s) in an original NFA, in an embodiment. States 511-518 of FIG. 5A are readily parsed from the example regex pattern but include multiple empty transitions. The states with such empty transitions may be merged into a single state. Accordingly, states 511-516 of FIG. 5A may be collapsed into a single state 521 of FIG. 5B, with the self-directed transition for the characters "a" and "b" corresponding to the original transitions between states 512 to 513 and between states 514 to 515.

In an embodiment, to streamline the evaluation of the automaton with string input data, the non-deterministic finite automaton is converted into a deterministic finite automaton (DFA). DFA is also a state machine, yet each reachable state has a different input for transition. For example, in FIG. 5B's NFA, when character "b" is received at state 521, the process may transition to both state 522 and back to state 521. In DFA, only one state should be reachable for the input character "b" at state 521.

Figure 5C:
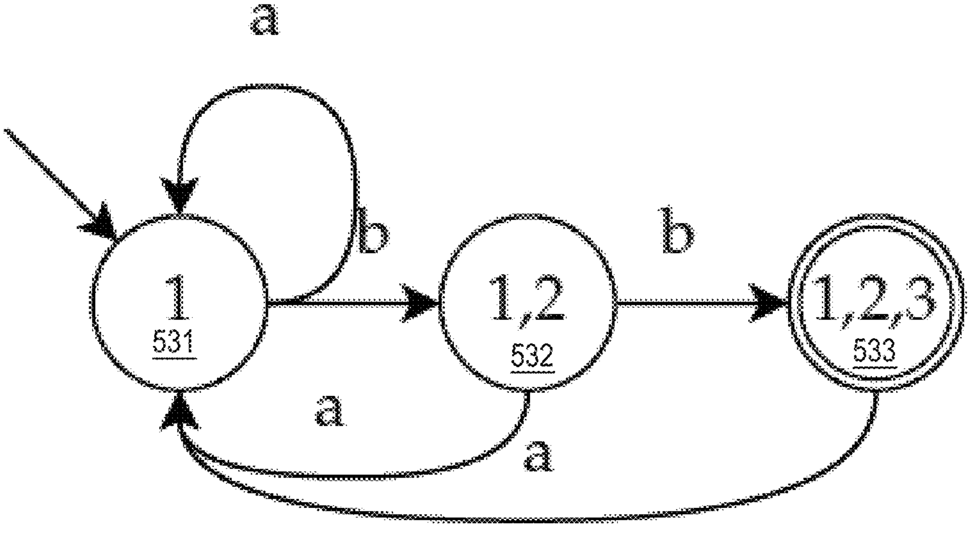
FIG. 5C is a block diagram that depicts a deterministic finite automaton for an example regular expression, in an embodiment.

FIG. 5C is a block diagram that depicts a deterministic finite automaton for an example regular expression, in an embodiment. Using a subset construction algorithm, automaton generator 122 converts an NFA for a regex pattern into a DFA for the regex pattern. According to the algorithm, because states 521 and 522 are both reachable from state 521 based on the transition with the input character "b", state 522 is converted into state 531 of FIG. 5C based on the merger of states 521 state 521. With the merger, a new transition is added from state 532 to state 531 (former state 521 of FIG. 5B) for the character input "a". Because merged state 532 may continue to have two transitions for character input "b" to state 531 (521) (not depicted in FIG. 5C) and 533 (523), the state 532 is merged with state 533 (523). Accordingly, state 533 acquires a new transition (from state 532) to state 531 for character input "a". State 533 acquires a self-directed transition for character input "b", but since state 533 is the final state, any transition out of such state may be omitted. Other conversion algorithms may be used to convert an NFA for a regex pattern to the DFA for the regex pattern. The exact methodology used is not critical for the approaches described herein.

In an embodiment, automaton generator 122 generates an NFA or a DFA based on the descriptors received from execution optimizer 110. Automaton generator 122 may validate or invalidate the assertion for selection of the automaton type based on other factors such as the available computing resources, the complexity of the regex patter, and/or the size of string data.

Dictionary Encoding

In an embodiment, the data source, such as database storage 157, may store string input data in a dictionary-encoded format. Accordingly, the string input data for the regex operator may be received in the dictionary-encoded format. As described above, decoding the dictionary-encoded format data into decoded format data for regex matching operation may consume computing resources. Decoding itself is an expensive operation, and the decoded string is generally greater in size. The greater size string input data requires more memory for storage and more cycles to evaluate the automaton.

According to one embodiment, one or more columns of DBMS 150 may be stored in columnar format. In such an embodiment, each unique column value in a data portion may be mapped to a dictionary token. An example of a columnar store that may use such a dictionary is described in "MIRRORING DATA APPLICATION", U.S. patent application Ser. No. 14/337,179, filed on Jul. 21, 2014, the entire content of which is incorporated herein by this reference. Table 1 includes an example portion of a dictionary for the column values in the "State" column.

TABLE 1

| Dictionary for "State" column | |
|---|---|
| Token | Column Value |
| A | AL |
| B | AK |
| C | AZ |
| D | AR |

OZIP Dictionary Encoding

According to another embodiment, the encoded format in which data is stored is in OZIP encoded format. OZIP encoding is described in "OZIP COMPRESSION AND DECOMPRESSION", application Ser. No. 14/337,113, filed on Jul. 21, 2014, the entire contents of which are hereby incorporated by reference.

In OZIP and other n-gram-based dictionary encodings, the dictionary entries are divided into N-gram entries (e.g., N is an integer value between 1 and 8 in the OZIP encoding). For example, the dictionary entry for "Foo" is categorized into 3-gram entries since "Foo" is composed of three character bytes. Since the dictionary entries extend up to 8-gram entries, each definition may have a maximum byte size of up to 8 bytes in OZIP. While separate N-gram entries are provided for every possible N-gram from 1 to 8, some N-grams may be empty and have zero entries, depending on the data patterns within input data.

The maximum byte size may be configured to correspond to a hardware specification, for example, based on a word size of a processor, including fractions and multiples of the word size, such as a half word or a quad word. For example, 64-bit processor architectures may utilize a 64-bit word size and 64-bit registers, in which case a maximum byte size of 8 bytes for the dictionary definitions may be appropriate. Similarly, a maximum byte size of 16 bytes might be appropriate for a 128-bit word size. However, the maximum byte size for the dictionary definitions may also be configured based on other performance considerations and does not necessarily need to be based on the word size.

Within the n-gram dictionary, 1-gram entries may be pre-populated with entries for all 256-byte values from 0x00 to 0xFF. In this manner, the compressor is guaranteed to be able to tokenize any input data. The remaining N-gram entries may each be populated using various data structures, such as tree structures built from segments of input data. Thus, the N-gram entries may each be maintained in decreasing order of frequency, with less frequent N-grams removed if the maximum possible number of candidate entries is exceeded, or 2048 total entries as an example.

In an embodiment, the n-gram dictionary may be further pruned based on the actual frequency data, statistics, historical data, and heuristics as well. The pruning limits the number of n-grams and, therefore, minimizes the number of tokens to be assigned, keeping the n-gram dictionary to a limited size.

In an embodiment, input data is tokenized using the n-gram dictionary to generate a packed sequential plurality of tokens. Since the process of tokenizing sequentially searches input data for matching dictionary entries within the n-gram dictionary, various data structures and search techniques, such as a trie-search, may be used for the tokenization process. Once a match is found, the token from the n-gram dictionary may be written into tokenized data. Such tokenized data may be referenced by a regex operator for execution in regex engine 120

Table 2 is an example portion of an n-gram dictionary for a data portion stored in database storage 157 that may be referenced by a regex operator.

TABLE 2

| Dictionary for a data portion. | |
|---|---|
| Token | n-gram |
| A | a |
| B | b |
| C | aab |
| D | bb |

Generating Encoded-String Automaton

Continuing with FIG. 3, at step 316, automaton generator 122 may determine, based on string input data or metadata thereof, that string input data contains encoded strings. At step 410 of FIG. 4, automaton generator 122 may additionally query for an encoded-string automaton corresponding to the specified regex pattern. If no encoded-string automaton exists for the regex pattern at step 415, the process proceeds to step 440 to generate an encoded-string automaton from the corresponding decoded string automaton, in an embodiment. The decoded-string automaton may be an NFA or DFA. Examples of a decoded-string automaton are depicted in FIGS. 5A-5C and described above in the "Automaton Generation" section.

FIG. 6 is a block diagram that depicts a process for generating an encoded-string automaton from a decoded-string automaton, in an embodiment. At step 605, automaton generator 122 obtains the decoded string automaton for the specified regex pattern to be matched on input string data. Automaton generator 122 replicates the states of the obtained decoded-string automaton for the to-be-generated encoded string automaton, in an embodiment. Automaton generator 122 traverses the decoded-string automaton to generate the corresponding encoded-string automaton.

For example, automaton generator 122 may obtain the NFA depicted in FIG. 5B for the regex with the pattern of "(a|b)*bb" pattern. The string input data is encoded in the OZIP dictionary encoding. The dictionary used for the encoding is the example dictionary for the OZIP encoded string data of Table 2. Using this example decoded-string automaton, automaton generator 122 replicates the states of the decoded-string automaton to the new to-be-generated encoded string automaton.

Figures 7A, 7B, 7C, 7D:
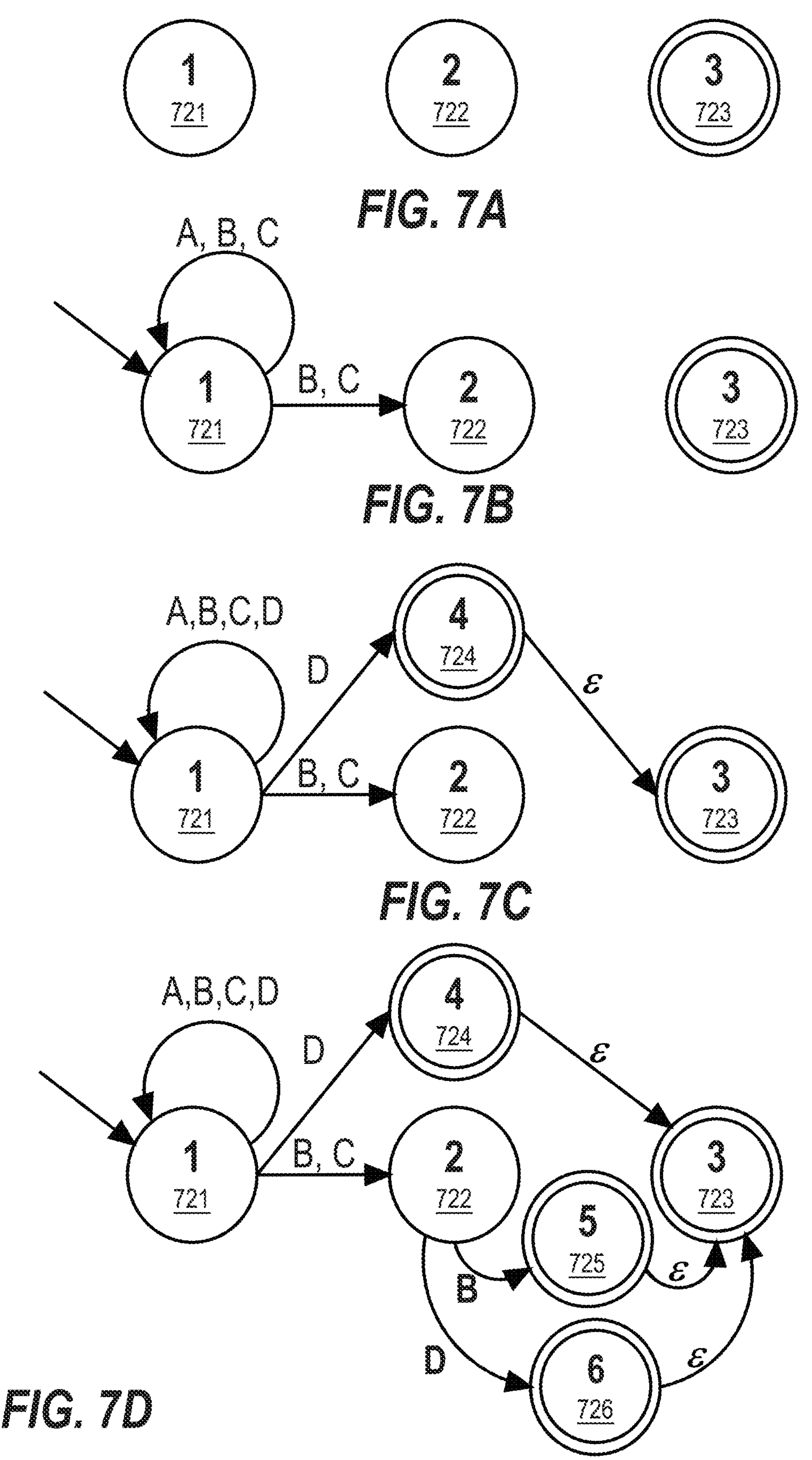
FIG. 7A-7D are block diagrams depicting states and transitions of an encoded-string automaton generated from an example decoded-string automaton, in one or more embodiments.

FIG. 7A-7D are block diagrams depicting states and transitions of an encoded-string automaton generated from an example decoded-string automaton, in one or more embodiments. In FIG. 7A, encoded-automaton states 721-723 are replicated from states 521-523 of FIG. 5B. The traversal of states 521-523 using the example dictionary values of Table 2 generates the transitions between the newly replicated states 721-723.

At steps 610-650, automaton generator 122 traverses through the decoded-string automaton by selecting one state as the source state at each iteration. At the first iteration, at step 610, automaton generator 122 selects the start state of the decoded-string automaton. Continuing with the decoded string automaton of FIG. 5B, state 521 is selected as the source state.

At steps 615-640, automaton generator 122 iterates through the tokens of the dictionary for the encoding. In each iteration of the steps, automaton generator 122 determines which states in the decoded-string automaton are reachable for the value of the selected token. At each iteration, at step 615, the dictionary value of the next token in the dictionary is selected until the decoded values for all tokens are processed for the selected source state at step 640. Using the automaton, at step 617, the process determines for each token of the dictionary the set of states that are reached from the selected source state using the corresponding decoded value of the selected token. The transitions are generated in the encoded-string automaton from the state that corresponds to the source state to the states that correspond to the reachable states. The transitions are conditioned (labeled) with the corresponding tokens in the encoded-string automaton.

Accordingly, when the selected decoded value from the dictionary is used as input into the decoded-string automaton at the source state, at step 617, no state, a single state, or multiple states may be reached. In the encoded-string automaton, the transition between the state corresponding to the source state and the state corresponding to each reachable state is labeled with the selected token as the condition for the transition.

Continuing with FIG. 5B example, the target states reachable from source state 521 for n-gram "a" of token A in Table 2 is state 521 itself. Accordingly, the equivalent transitions are generated for the encoded-string dictionary in FIG. 7B. From state 721 (corresponding to state 521), the same state 721 is reachable using token A. Similarly, for n-gram "b" of token B, states 521 and 522 are reachable from state 521, and for n-gram "aab" of token C, states 521 and 522 are reachable. These transitions cause the generation of transitions for tokens B and C from state 721 to states 721 and 722 in FIG. 7B.

In an embodiment, at step 620, automaton generator 122 determines whether any of the reachable states of the decoded-string automaton is the final state. If so, then automaton generator 122 generates a new state for the encoded string automaton and adds the new state to the reachable states from the selected source state. The new state may be added as the final state for the encoded-string automaton. Additionally, in the encoded-string automaton, automaton generator 122 generates an empty transition from the new state to the state corresponding to the final state in the decoded-string automaton. The transition from the corresponding source state in the encoded-string automaton to the new state corresponds to the token for the transition from the selected source state to the reachable state in the decoded-string automaton.

Continuing with the example decoded-string automaton of FIG. 5B. When n-gram "bb" of token D is selected, the states reached from state 521 include state 521 and final state 523. For final state 523, automaton generator 122 generates a new state 724 of FIG. 7C with token D transition from state 721 (corresponding to selected source state 521). Between new state 724 and state 723 corresponding to final state 523, an empty transition is generated.

In an embodiment, if no token's decoded value provides a transition from the start state to the final state, then automaton generator 122 determines that no string in the data set of the dictionary may match the specified regex pattern. Because the dictionary-decoded values correspond to the full set of all possible combinations of characters found in the data set, if no possible transition is determined from the start state to the final state, then no match can possibly occur within the data set.

Continuing with the example of Table 1, the dictionary, for a portion of the column, includes only states that start with the character "A". If a regex pattern is specified for the states that start with the character "C", then when the encoded-string automaton is generated, no possible transition can possibly occur between the initial state and the final state.

Continuing with FIG. 6, at step 650, the next state in the decoded-string automaton is not the final state; the state is selected as the source state. Steps 610-650 are executed for the new source state. For example, continuing with FIG. 5B's decoded-string automaton, state 522 is selected as the next source state, and the dictionary-decoded values are iterated as the input for the source state to transition to the next state. The n-grams "a" and "aab" corresponding to tokens A and C yield no state transition, while the n-grams "b" and "bb" corresponding to tokens B and D yield transition to final state 523. Accordingly, as depicted in FIG. 7D, the encoded-string automaton includes transitions from state 722 (corresponding to the source state 522) for tokens B and D to the new final states 725 and 725, respectively, and empty transitions to final state 723.

At step 650, when no other state may be selected in the decoded-string automaton, the encoded string automaton has been generated.

Figure 8A:
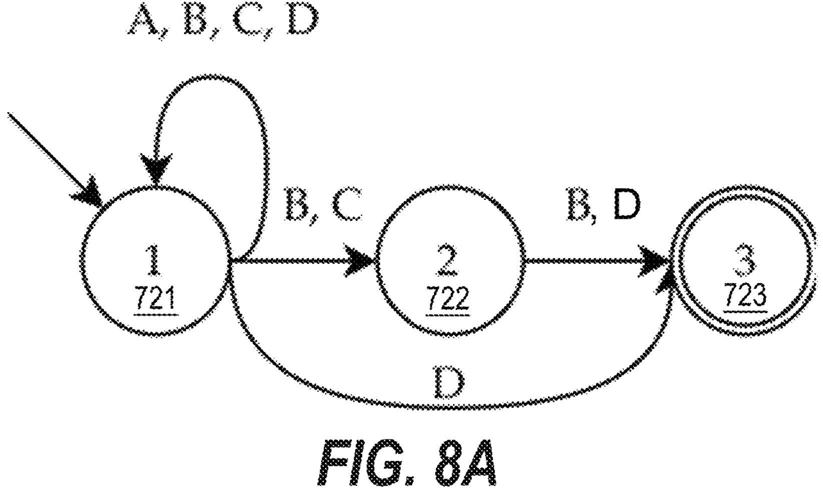
FIG. 8A is a block diagram depicting an encoded-string automaton optimized from the encoded-string automaton of FIG. 7D, in an embodiment.

In an embodiment, an encoded-string automaton is further optimized by collapsing repetitive states similar to techniques discussed for decoded-string automatons. FIG. 8A is a block diagram depicting an encoded-string automaton optimized from the encoded-string automaton of FIG. 7D, in an embodiment. In particular, final states 724, 725, and 726 that have an empty transition to final state 723 are collapsed into state 723.

Figure 8B:
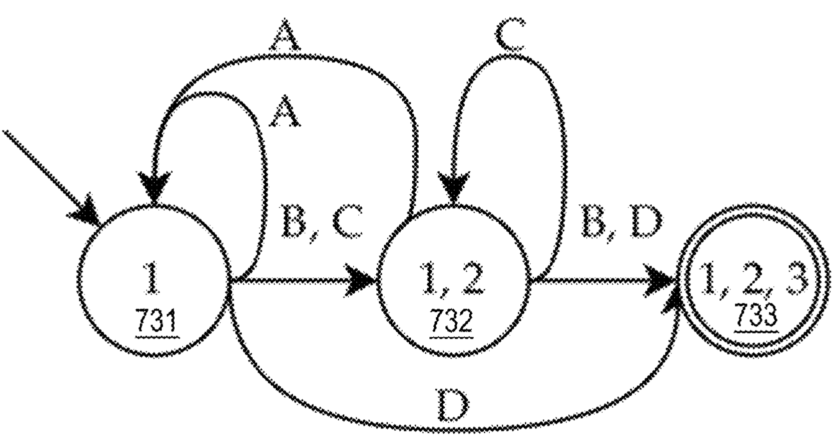
FIG. 8B is a block diagram that depicts an encoded string DFA converted from the encoded string NFA from FIG. 8A, in an embodiment.

Additionally, an encoded-string automaton, when generated from a decoded-string automaton, may be an NFA, as multiple transitions may be present for the same token. As discussed above, an NFA may be converted to DFA. Similarly, an encoded string NFA may be converted to an encoded-string DFA using the same techniques as discussed for decoded-string automatons above. FIG. 8B is a block diagram that depicts an encoded string DFA converted from the encoded string NFA from FIG. 8A, in an embodiment.

In an embodiment, automaton generator 122 generates an NFA or a DFA based on the descriptors received from execution optimizer 110. Automaton generator 122 may validate or invalidate the assertion for selection of the automaton type based on other factors such as the available computing resources, the complexity of the regex patter, and/or the size of string data.

Automaton Execution Logic

Continuing with FIG. 4, at step 425, automaton generator 122 may generate execution logic for the NFA or the DFA of the regex pattern. In an embodiment, automaton generator 122 run-time compiles the generated automaton into machine code, an execution logic for the automaton. Such execution logic may define a set of methods for matching the automaton over an input string and extracting the result of the computation. The execution logic may be readily executed within DBMS 150 (e.g., a software virtual machine may readily execute the generated machine code). Alternatively, automaton generator 122 may generate a data structure for the automaton as an automaton object.

In an embodiment, the determination of whether automaton generator 122 generates a compiled execution logic or a data structure is based on the descriptors received from the execution optimizer 110. Automaton generator 122 may validate or invalidate the assertion for selection of the automaton object type based on other factors such as the available computing resources, the complexity of the regex patter, and/or the size of string data.

At step 430, automaton generator 122 stores the automaton object, which may include the execution logic for the automaton, into automaton object store 127. Accordingly, the next time the same regex pattern is evaluated by DBMS 150, automaton generator 122 may skip parsing the regex pattern at step 420 and generating automaton execution logic at step 425, and retrieve the ready-to-execute automaton object data from automaton object store 127.

At step 435, and continuing with FIG. 3, at step 324, automaton generator 122 returns automaton object data to execution optimizer 110. The automaton object data may be the handle for the generated and/or stored automaton object.

Generating Data Descriptors

At step 328, execution optimizer 110 generates string input data descriptor(s) for regex engine 120. String input data descriptors describe various properties of string input data for the regex evaluation. With the apriori knowledge of such properties, regex evaluator 124 may more efficiently process string input data and/or perform the regex pattern matching in the string input data. One or more descriptors may correspond to a particular assertion made by regex evaluator 124 about which execution logic to use from alternative execution logics corresponding to the assertion.

The data descriptor may provide information on access methodology and interpretation of the string input data. For example, a data descriptor may indicate the datatype of the string input data. The datatype may be the datatype of the database column on which the regex operator is performed. Depending on the datatype, regex evaluator 124 may have different execution logic to read string data from database storage 157. For example, for the varchar data type, direct memory access may be used by regex evaluator 124 as compared to the LOB data type, which is streamed, and thus fetch cycles are used.

Another data descriptor may indicate the character set/encoding of string input data. Based on the character set/encoding, regex evaluator 124 may have different execution logic to process input strings for evaluation with the automaton object.

Yet another data descriptor may indicate the data access type for string input data. For example, in columnar arrangement, column values are arranged in vectors of a particular size. The descriptor may provide the size of the columnar vector. Similarly, another descriptor may provide the number of rows in a memory block for row-based storage.

Continuing with FIG. 3, at step 332, execution optimizer 110 may provide the descriptor(s) to regex evaluator 124 for validating assertion. Additionally, execution optimizer 110 may provide to regex evaluator 124 input string data and automaton object data. The input string data may be a pointer to a memory where the strings are stored or a cursor to fetch strings. The automaton object data may be the handle to the automaton object generated by automaton generator 122 and stored automaton object store 127.

Optimized Regex Evaluator

Regex evaluator 124 contains one or more sets of alternative execution logics. Regex evaluator 124 is configured to execute the same task using each of the alternative execution logics but under different assertions about input. At run-time, each of the alternative execution logics may be loaded for the execution of a task. The computing resources spent on loading the execution logic or switching to an alternative execution logic are part of the warm-up cost discussed above. For example, execution logic may include machine code, which may be just-in-time compiled for execution of the task. The computing resources used for compiling the code into native machine code are part of the warm-up cost.

In an embodiment, regex evaluator 124 is further optimized by reducing branching instructions. For example, the assertion may indicate that the input string data is not only retrieved as a columnar vector, but the cardinality of a such vector is 10. Rather than looping the retrieval of the value 10 times, the machine code may unroll the loop and have 10 separate memory read calls. Such unrolling in the machine code or other types of execution logic significantly increases the efficiency of the execution of the string retrieval logic. Additionally, the unrolling may increase the efficiency of other operations that may be dependent on the branch and now, when unrolled, may execute in parallel.

Speculative Execution

Continuing with FIG. 3, at step 334, in response to the request for executing the matching based on the provided descriptors, input string data, and/or automaton object data, regex evaluator 124 starts performing the regex evaluation. The evaluation may be initiated based on the previously validated assertions and the corresponding execution logic(s) performing the task(s) while the received descriptor(s) validate such assertion or until such assertion(s) are invalidated at step 336.

Figure 9:
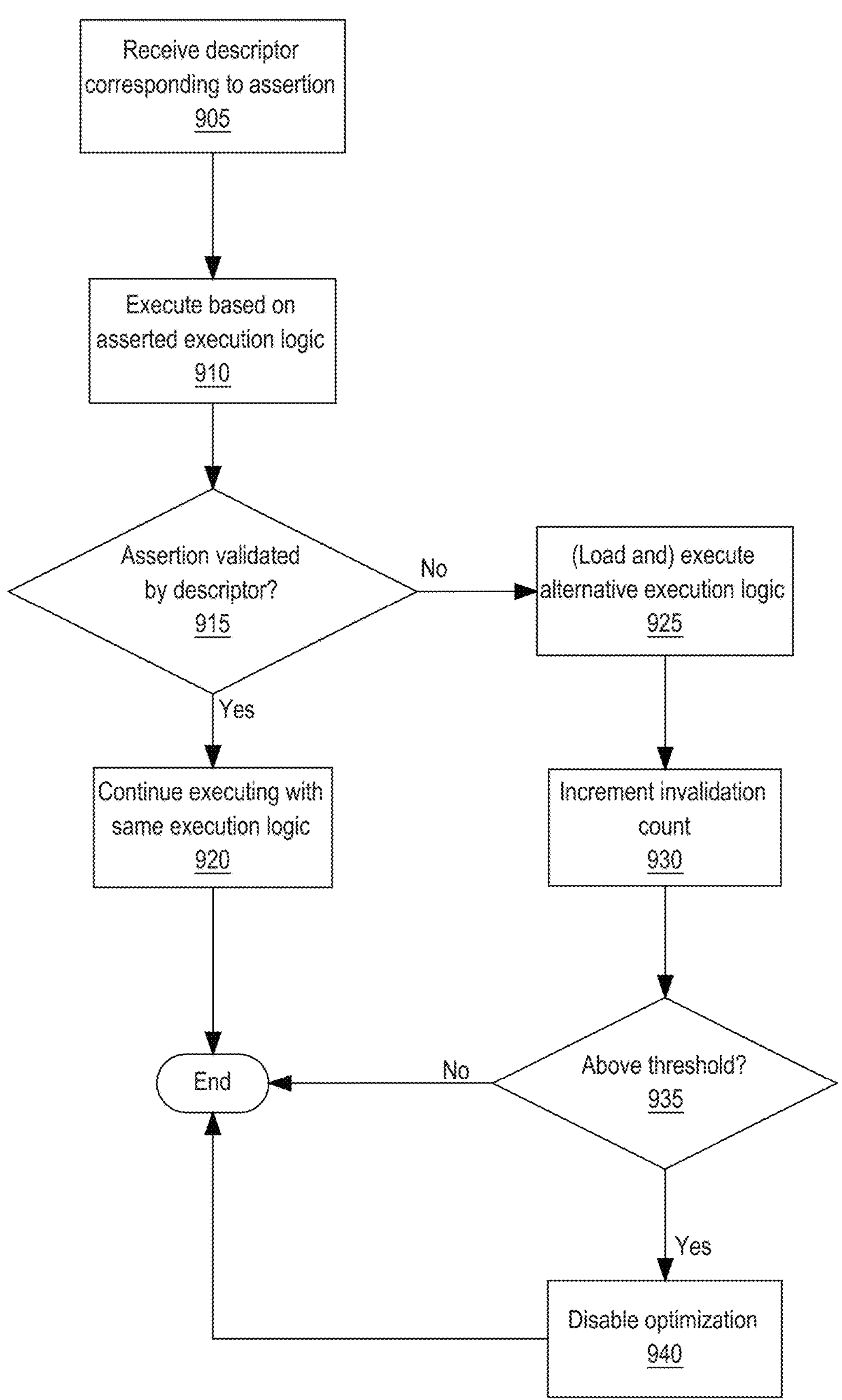
FIG. 9 is a block diagram that depicts a process for validating an assertion for alternative execution logics, in an embodiment.

FIG. 9 is a block diagram that depicts a process for validating an assertion for alternative execution logics, in an embodiment. At step 905, regex evaluator 124 receives descriptor(s) from execution optimizer 110 (as previously discussed for step 332 of FIG. 3) to optimize executing of a particular task for regex matching. Before or while receiving the input from execution optimizer 110, regex evaluator 124 has loaded the execution logic for the task based on the assertion's previous validation or based on the default configuration.

Accordingly, in an embodiment, regex evaluator 124 starts executing the particular task using the pre-loaded execution logic, at step 910, before validating the assertion at step 915. In another embodiment, although the execution logic of the particular task for the previously validated assertion has been loaded, the execution of the task starts only after the assertion is validated based on the received descriptor(s).

Continuing with the columnar vector input string data above, regex evaluator 124 may be configured with alternative execution logics for performing the task of reading column values of a column referenced in the input string data. Based on the previous execution of the task, an assertion is made for the columnar vector having a cardinality of 10. Therefore, regex evaluator 124 has loaded an execution logic that contains optimized execution logic that unrolls the looping over the elements by 10 machine code calls for the reading of column values.

At step 915, the assertion for the execution logic of the particular task is validated based on the received descriptor(s). If the descriptor(s), in fact, validates that the assertion continues to be correct, the process proceeds to step 920. At step 920, the process may either continue or start executing based on the previous assertion. Accordingly, the speculative execution of the pre-selected execution logic from alternative execution logics is validated when the process transitions to step 920.

Continuing with the above example, when regex evaluator 124 receives the descriptor that indicates that the input string data is indeed columnar and is stored as a columnar vector with a cardinality of 10, the previous assertion is validated. As long as subsequent input string data continues to be the same type, the speculative execution is validated. The optimized execution logic for reading column values executes using the unrolled memory read execution, which spends less computing resources and decreases the latency of the execution.

On the other hand, the speculative execution may be invalidated if, at step 915, the assertion is invalidated by the received descriptor(s). In such a case, the process proceeds to step 925. At step 925, based on the received descriptor(s), regex evaluator 124 determines which one of the alternative execution logics (if multiple) to select for the execution of the particular task.

In one embodiment, the alternative execution logics for the particular task are pre-loaded for the execution. In another embodiment, the selected alternative execution logic is loaded at step 925 after invalidating the assertion for the original execution logic for the particular task. Regex evaluator 124 may determine whether to pre-load the alternative execution logics or not.

Similarly, based on the optimization level, regex evaluator 124 may determine whether to execute on alternative optimized execution logic or fallback to default execution logic that has no optimization.

Continuing with the columnar vector input example, on the next execution, the input string data may reference columnar vectors of cardinality of 15. The assertion for the columnar vector of cardinality of 10 is accordingly invalidated. If the optimization level is high for regex evaluator 124, regex evaluator 124 may have machine code that unrolls 15 memory reads to read the columnar vectors from memory. Alternatively, regex evaluator 124 may invoke a just-in-time compiler to compile new machine code that unrolls 15 memory calls and loads the compiled machine code for execution. As yet another alternative, regex evaluator 124 may invoke fallback machine code that is not optimized and does not unroll the looping of the columnar vector in the memory.

At step 930, regex evaluator 124 may track the number of invalidations for the particular task (and/or for any task). If the number of invalidations is above a threshold at step 935, then, at step 940, regex evaluator 124 may disable all optimizations and/or just the optimization for the particular task. The threshold may depend on the optimization level.

Regex evaluator 124 may be configured to speculatively execute multiple tasks in the regex matching, including the evaluation of the regex patter on input strings by the automaton object.

Continuing with FIG. 3, at step 334, the execution of matching the regex pattern in input string data completes, and the result data is returned to execution optimizer 110 and to query optimizer 140 at steps 340 and 344. The result data may be a Boolean indicating whether the regex patter indeed matched and/or a matched substring.

Database Management System Overview

A database management system (DBMS) manages a database. A DBMS may comprise one or more database servers. A database comprises database data and a database dictionary that are stored on a persistent memory mechanism, such as a set of hard disks. Database data may be stored in one or more collections of records. The data within each record is organized into one or more attributes. In relational DBMSs, the collections are referred to as tables (or data frames), the records are referred to as records, and the attributes are referred to as attributes. In a document DBMS ("DOCS"), a collection of records is a collection of documents, each of which may be a data object marked up in a hierarchical-markup language, such as a JSON object or XML document. The attributes are referred to as JSON fields or XML elements. A relational DBMS may also store hierarchically-marked data objects; however, the hierarchically-marked data objects are contained in an attribute of record, such as JSON typed attribute.

Users interact with a database server of a DBMS by submitting to the database server commands that cause the database server to perform operations on data stored in a database. A user may be one or more applications running on a client computer that interacts with a database server. Multiple users may also be referred to herein collectively as a user.

A database command may be in the form of a database statement that conforms to a database language. A database language for expressing the database commands is the Structured Query Language (SQL). There are many different versions of SQL; some versions are standard and some proprietary, and there are a variety of extensions. Data definition language ("DDL") commands are issued to a database server to create or configure data objects referred to herein as database objects, such as tables, views, or complex data types. SQL/XML is a common extension of SQL used when manipulating XML data in an object-relational database. Another database language for expressing database commands is Spark™ SQL, which uses a syntax based on function or method invocations.

In a DOCS, a database command may be in the form of functions or object method calls that invoke CRUD (Create Read Update Delete) operations. An example of an API for such functions and method calls is MQL (MondoDB™ Query Language). In a DOCS, database objects include a collection of documents, a document, a view, or fields defined by a JSON schema for a collection. A view may be created by invoking a function provided by the DBMS for creating views in a database.

Changes to a database in a DBMS are made using transaction processing. A database transaction is a set of operations that change database data. In a DBMS, a database transaction is initiated in response to a database command requesting a change, such as a DML command requesting an update, insert of a record, or a delete of a record or a CRUD object method invocation requesting to create, update or delete a document. DML commands and DDL specify changes to data, such as INSERT and UPDATE statements. A DML statement or command does not refer to a statement or command that merely queries database data. Committing a transaction refers to making the changes for a transaction permanent.

Under transaction processing, all the changes for a transaction are made atomically. When a transaction is committed, either all changes are committed, or the transaction is rolled back. These changes are recorded in change records, which may include redo records and undo records. Redo records may be used to reapply changes made to a data block. Undo records are used to reverse or undo changes made to a data block by a transaction.

An example of such transactional metadata includes change records that record changes made by transactions to database data. Another example of transactional metadata is embedded transactional metadata stored within the database data, the embedded transactional metadata describing transactions that changed the database data.

Undo records are used to provide transactional consistency by performing operations referred to herein as consistency operations. Each undo record is associated with a logical time. An example of logical time is a system change number (SCN). An SCN may be maintained using a Lamporting mechanism, for example. For data blocks that are read to compute a database command, a DBMS applies the needed undo records to copies of the data blocks to bring the copies to a state consistent with the snap-shot time of the query. The DBMS determines which undo records to apply to a data block based on the respective logical times associated with the undo records.

In a distributed transaction, multiple DBMSs commit a distributed transaction using a two-phase commit approach. Each DBMS executes a local transaction in a branch transaction of the distributed transaction. One DBMS, the coordinating DBMS, is responsible for coordinating the commitment of the transaction on one or more other database systems. The other DBMSs are referred to herein as participating DBMSs.

A two-phase commit involves two phases, the prepare-to-commit phase, and the commit phase. In the prepare-to-commit phase, branch transaction is prepared in each of the participating database systems. When a branch transaction is prepared on a DBMS, the database is in a "prepared state" such that it can guarantee that modifications executed as part of a branch transaction to the database data can be committed. This guarantee may entail storing change records for the branch transaction persistently. A participating DBMS acknowledges when it has completed the prepare-to-commit phase and has entered a prepared state for the respective branch transaction of the participating DBMS.

In the commit phase, the coordinating database system commits the transaction on the coordinating database system and on the participating database systems. Specifically, the coordinating database system sends messages to the participants requesting that the participants commit the modifications specified by the transaction to data on the participating database systems. The participating database systems and the coordinating database system then commit the transaction.

On the other hand, if a participating database system is unable to prepare or the coordinating database system is unable to commit, then at least one of the database systems is unable to make the changes specified by the transaction. In this case, all of the modifications at each of the participants and the coordinating database system are retracted, restoring each database system to its state prior to the changes.

A client may issue a series of requests, such as requests for execution of queries, to a DBMS by establishing a database session. A database session comprises a particular connection established for a client to a database server through which the client may issue a series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e. can be created or terminated by the database server) and perform various database server functions. Database processes include processes running within a database session established for a client.

A database process is a unit of execution. A database process can be a computer system process or thread or a user-defined execution context such as a user thread or fiber. Database processes may also include "database server system" processes that provide services and/or perform functions on behalf of the entire database server. Such database server system processes include listeners, garbage collectors, log writers, and recovery processes.

A multi-node database management system is made up of interconnected computing nodes ("nodes"), each running a database server that shares access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A database dictionary may comprise multiple data structures that store database metadata. A database dictionary may, for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the attribute names and data types of the attributes, and one or more files or portions thereof that store data for the table. Metadata in the database dictionary defining a procedure may specify a name of the procedure, the procedure's arguments and the return data type, and the data types of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user-defined function implemented in a JAVA class may be defined in part by the database dictionary by specifying the name of the user-defined function and by specifying a reference to a file containing the source code of the Java class (i.e. .java file) and the compiled version of the class (i.e. .class file).

Native data types are data types supported by a DBMS "out-of-the-box". Non-native data types, on the other hand, may not be supported by a DBMS out-of-the-box. Non-native data types include user-defined abstract types or object classes. Non-native data types are only recognized and processed in database commands by a DBMS once the non-native data types are defined in the database dictionary of the DBMS, by, for example, issuing DDL statements to the DBMS that define the non-native data types. Native data types do not have to be defined by a database dictionary to be recognized as a valid data types and to be processed by a DBMS in database statements. In general, database software of a DBMS is programmed to recognize and process native data types without configuring the DBMS to do so by, for example, defining a data type by issuing DDL statements to the DBMS.

Graph Processing Systems

A graph processing system receives graph queries, executes graph queries and returns results for the graph queries. Graph queries may comply with a graph query language, such as PGQL, GQL, Cypher, Gremlin, or SPARQL.

A graph processing system may be implemented on a computing node or a multi-node system. A graph processing system may store graph data in an in-memory form in byte-addressable memory. In-memory forms include the compressed sparse row (CSR) form and reverse CSR form. A graph processing system may persistently store graph data in a DBMS to which the graph processing system is connected. The graph data may be stored in relational tables, such as vertex tables and edge tables, or documents that store vertices and edges of a graph. Alternatively, the graph data may be persistently stored in a file system, where vertices and edges of a graph are stored in CSV files. A graph may be loaded in memory in an in-memory form to execute a graph query against the graph.

A graph processing system may be integrated into a DBMS as native functionality of the DBMS. A DBMS may define a graph and one or more vertex and edge tables and documents that store vertices and edges of the graph. A DBMS may load a graph from persistent storage into byte addressable to execute a graph query against the graph. A DBMS may also rewrite a graph query into database commands, such as SQL statements, that can be executed against vertex and edge tables that store graph data.

Software Overview

Figure 10:
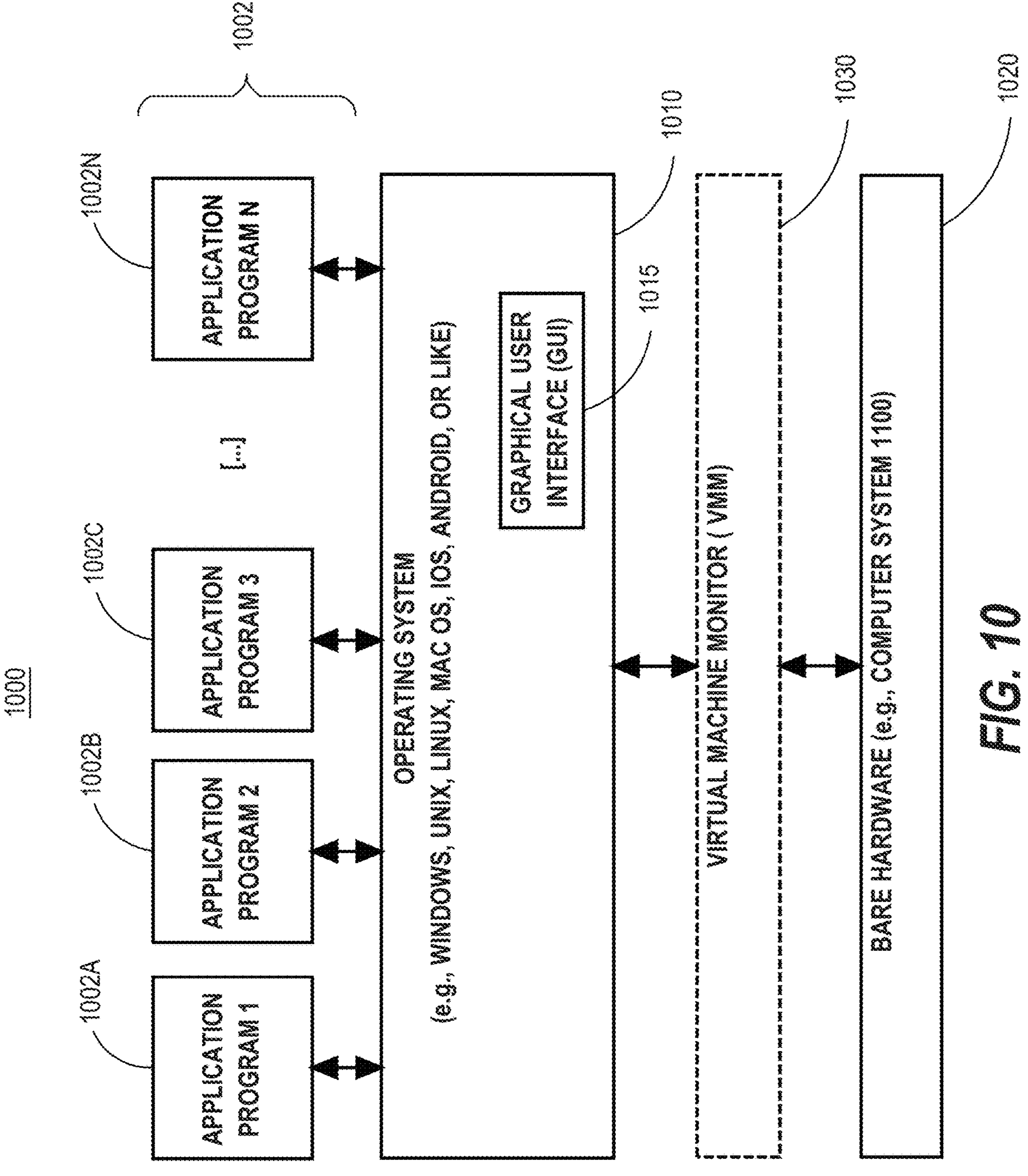
FIG. 10 is a block diagram of a basic software system, in one or more embodiments.
Figure 11:
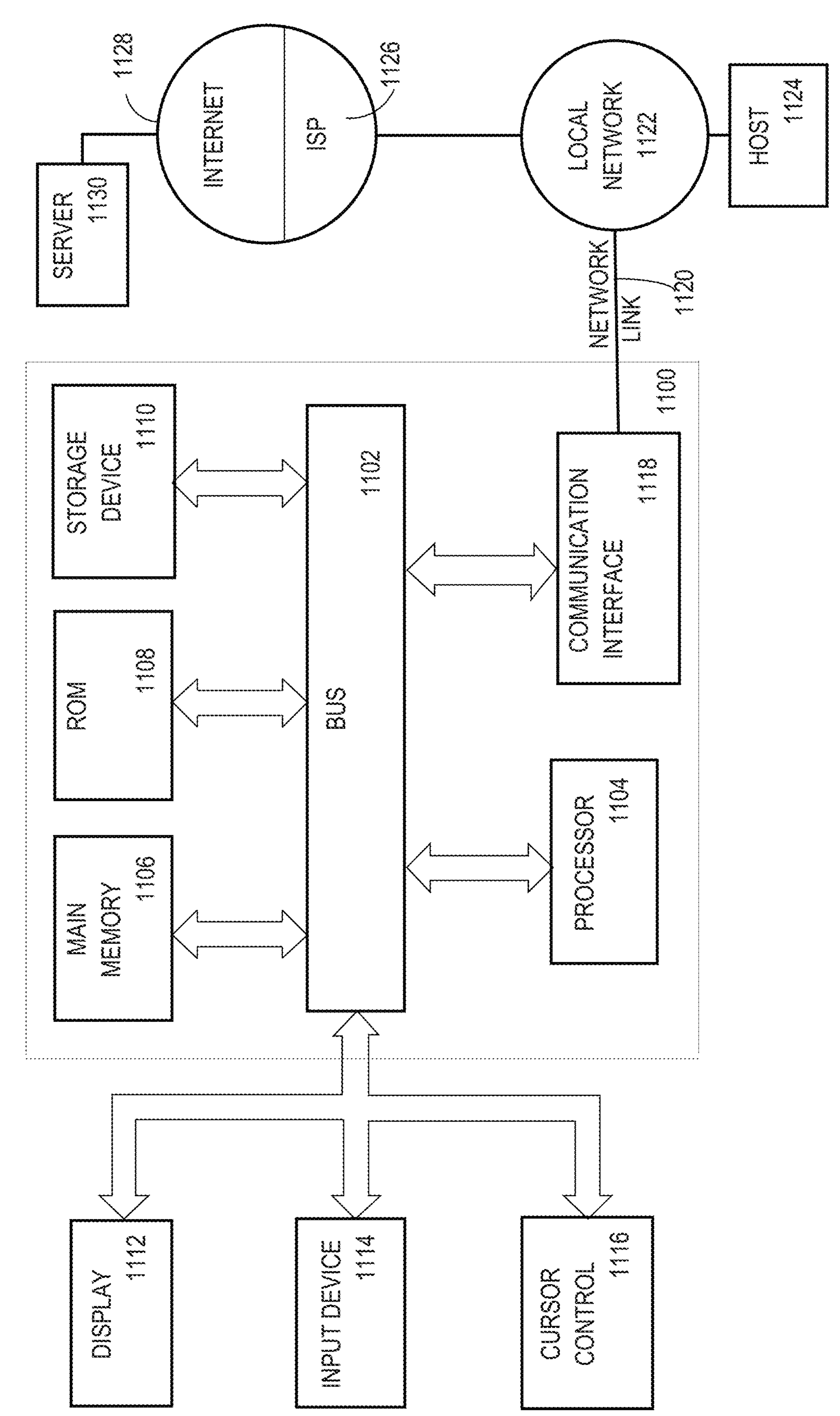
FIG. 11 is a block diagram that illustrates a computer system upon which an embodiment of the invention may be implemented.

FIG. 10 is a block diagram of a basic software system 1000 that may be employed for controlling the operation of computing system 1100 of FIG. 11. Software system 1000 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computing system 1100. Software system 1000, which may be stored in system memory (RAM) 1106 and on fixed storage (e.g., hard disk or flash memory) 1110, includes a kernel or operating system (OS) 1010.

The OS 1010 manages low-level aspects of computer operation, including managing execution of processes, memory allocation, file input and output (I/O), and device I/O. One or more application programs represented as 1002A, 1002B, 1002C . . . 1002N, may be "loaded" (e.g., transferred from fixed storage 1110 into memory 1106) for execution by the system 1000. The applications or other software intended for use on computer system 1100 may also be stored as a set of downloadable computer-executable instructions, for example, for downloading and installation from an Internet location (e.g., a Web server, an app store, or another online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 1104) of computer system 1100. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 1100.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 1100 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by or within a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers. In a cloud computing environment, there is no insight into the application or the application data. For a disconnection-requiring planned operation, with techniques discussed herein, it is possible to release and then to later rebalance sessions with no disruption to applications.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general-purpose microprocessor.

Computer system 1100 also includes a main memory 1106, such as a random access memory (RAM) or another dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read-only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110.

Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal, and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126, in turn, provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110 or other non-volatile storage for later execution.

Computing Nodes and Clusters

A computing node is a combination of one or more hardware processors that each share access to a byte-addressable memory. Each hardware processor is electronically coupled to registers on the same chip of the hardware processor and is capable of executing an instruction that references a memory address in the addressable memory, and that causes the hardware processor to load data at that memory address into any of the registers. In addition, a hardware processor may have access to its separate exclusive memory that is not accessible to other processors. The one or more hardware processors may be running under the control of the same operating system A hardware processor may comprise multiple core processors on the same chip, each core processor ("core") being capable of separately executing a machine code instruction within the same clock cycles as another of the multiple cores. Each core processor may be electronically coupled to connect to a scratchpad memory that cannot be accessed by any other core processor of the multiple core processors.

A cluster comprises computing nodes that each communicate with each other via a network. Each node in a cluster may be coupled to a network card or a network-integrated circuit on the same board of the computing node. Network communication between any two nodes occurs via the network card or network integrated circuit on one of the nodes and a network card or network integrated circuit of another of the nodes. The network may be configured to support remote direct memory access.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:

receiving a string input data and a regex pattern, the string input data indicating one or more decoded strings with which the regex pattern is to be matched;

determining an encoded-string automaton that is associated with the regex pattern;

wherein one or more input tokens are generated by encoding the one or more decoded strings using a particular encoding;

evaluating the encoded-string automaton using the one or more input tokens, at least in part, by performing one or more encoded-string transitions in the encoded-string automaton that are conditioned on a particular set of tokens that are encoded using the same particular encoding;

wherein the evaluating the encoded-string automaton using the one or more input tokens causes generating same result data as for matching the regex pattern in the one or more decoded strings of the string input data.

2. The method of claim 1, wherein the one or more decoded strings are encoded into the one or more input tokens using a dictionary of a plurality of unique decoded-string values, and wherein the dictionary includes mappings of the plurality of unique decoded-string values to a plurality of tokens that includes the one or more input tokens.

3. The method of claim 2, wherein the plurality of unique decoded-string values in the dictionary are unique n-grams.

4. The method of claim 2, wherein the string input data indicates one or more columns of a database management system (DBMS) and the one or more decoded strings are one or more column values in the one or more columns of the DBMS.

5. The method of claim 4, wherein each column value of the one or more columns is encoded using the dictionary into one or more corresponding tokens and wherein the DBMS stores the one or more corresponding tokens for said each column value in the one or more columns.

6. The method of claim 1, wherein the one or more encoded-string transitions in the encoded-string automaton corresponds to one or more decoded-string transitions conditioned on a set of decoded-string values in a respective decoded-string automaton of the regex pattern, and the set of decoded-string values for the one or more decoded-string transitions is mapped to the set of tokens of the one or more encoded-string transitions in a dictionary of the string input data.

7. The method of claim 1, wherein evaluating the regex pattern comprises determining the encoded-string automaton associated with regex pattern indicates that no string exists in the one or more decoded strings that matches the regex pattern.

8. The method of claim 1, wherein the encoded-string automaton is based on a deterministic finite state automaton or a non-deterministic finite state automaton.

9. The method of claim 1, wherein the encoded-string automaton is a non-deterministic finite state automaton, and the method further comprising converting the encoded-string automaton to a deterministic finite state automaton.

10. One or more non-transitory computer-readable media storing a set of instructions, wherein the set of instructions includes instructions, which, when executed by one or more hardware processors, cause:

receiving a string input data and a regex pattern, the string input data indicating one or more decoded strings with which the regex pattern is to be matched;

determining an encoded-string automaton that is associated with the regex pattern;

wherein one or more input tokens are generated by encoding the one or more decoded strings using a particular encoding;

evaluating the encoded-string automaton using the one or more input tokens, at least in part, by performing one or more encoded-string transitions in the encoded-string automaton that are conditioned on a particular set of tokens that are encoded using the same particular encoding;

wherein the evaluating the encoded-string automaton using the one or more input tokens causes generating same result data as for matching the regex pattern in the one or more decoded strings of the string input data.

11. The one or more non-transitory computer-readable media of claim 10, wherein the one or more decoded strings are encoded into the one or more input tokens using a dictionary of a plurality of unique decoded-string values, and wherein the dictionary includes mappings of the plurality of unique decoded-string values to a plurality of tokens that includes the one or more input tokens.

12. The one or more non-transitory computer-readable media of claim 11, wherein the plurality of unique decoded-string values in the dictionary are unique n-grams.

13. The one or more non-transitory computer-readable media of claim 11, wherein the string input data indicates one or more columns of a database management system (DBMS) and the one or more decoded strings are one or more column values in the one or more columns of the DBMS.

14. The one or more non-transitory computer-readable media of claim 13, wherein each column value of the one or more columns is encoded using the dictionary into one or more corresponding tokens and wherein the DBMS stores the one or more corresponding tokens for said each column value in the one or more columns.

15. The one or more non-transitory computer-readable media of claim 10, wherein the one or more encoded-string transitions in the encoded-string automaton corresponds to one or more decoded-string transitions conditioned on a set of decoded-string values in a respective decoded-string automaton of the regex pattern, and the set of decoded-string values for the one or more decoded-string transitions is mapped to the set of tokens of the one or more encoded-string transitions in a dictionary of the string input data.

16. The one or more non-transitory computer-readable media of claim 10, wherein evaluating the regex pattern comprises determining the encoded-string automaton associated with regex pattern indicates that no string exists in the one or more decoded strings that matches the regex pattern.

17. The one or more non-transitory computer-readable media of claim 10, wherein the encoded-string automaton is based on a deterministic finite state automaton or a non-deterministic finite state automaton.

18. The one or more non-transitory computer-readable media of claim 10, wherein the encoded-string automaton is a non-deterministic finite state automaton, and wherein the set of instructions further includes instructions, which, when executed by said one or more hardware processors, cause converting the encoded-string automaton to a deterministic finite state automaton.

* * * * *